Oct. 14, 1941.                F. D. SNYDER                 2,259,330
                         SPLIT-PHASE MOTOR CONTROL
                         Filed Aug. 17, 1938        2 Sheets-Sheet 1

WITNESSES:
C. J. Weller.
B. L. Zangwill

INVENTOR
Frederick D. Snyder.
BY
O. R. Buchanan
ATTORNEY

Oct. 14, 1941.  F. D. SNYDER  2,259,330

SPLIT-PHASE MOTOR CONTROL

Filed Aug. 17, 1938  2 Sheets-Sheet 2

WITNESSES:

INVENTOR
Frederick D. Snyder.
BY
ATTORNEY

Patented Oct. 14, 1941

2,259,330

UNITED STATES PATENT OFFICE 2,259,330

SPLIT-PHASE MOTOR CONTROL

Frederick D. Snyder, East Milton, Mass., assignor to Westinghouse Electric & Manufacturing Company, East Pittsburgh, Pa., a corporation of Pennsylvania Application August 17, 1938, Serial No. 225,407

7 Claims. (Cl. 172—279)

My invention relates primarily to that kind of dynamo-electric machine known as a split phase motor, and is of particular application to motors of smaller power which have automatically disconnectible starting windings.

Motors of this kind are commonly started by means of a split phase field component obtained in any well known manner as, for example, by making the starting winding of a high resistance and low inductance relative to the like characteristics of the main running winding, or by employing a capacitor in conjunction with an appropriate starting winding, or by some other means. In small motors as customarily designed, the starting winding yielding the split phase component however obtained, cannot be supplied with energy for any appreciable length of time without the danger of burning out due either to the high heating in the winding or to low heat dissipation. To prevent this, a switch is generally used responsive to the speed of the motor and which disconnects the starting winding or circuit when a selected predetermined speed is reached in the acceleration of the motor, the running winding being sufficient to maintain the rotation of the motor thereafter. My invention employs this switch in additional capacities for either the protection, or control, or both, of the motor.

An important aspect of my invention lies in the utilization of the aforesaid switch in a protective system for a motor. The system will disconnect the power supply from the motor in the event that the rotor of the motor falls below a predetermined speed which may be due to an overloading of the motor, or an undervoltage on the power supply line, or any other cause. I disclose a number of embodiments in which the speed responsive switch not only disconnects the starting winding after the motor has reached the proper speed during its acceleration toward its running speed, but also disconnects the main running winding if subsequently the speed should fall below that for which the switch is set. Although the speed falls below this value, the connections are such that the starting winding is not reconnected by the restoration of the switch to its initial position. In this manner, the electrical power to the motor is completely disconnected if the rotor should stall or should fall below its running speed for any reason. This simple provision prevents burning out of the windings of a stalled or overloaded motor by a simple and economical means.

Motors of the class to which my invention applies generally have a centrifugally operated means rotated by the rotor of the machine for controlling the position of the switch that disconnects the starting winding. The most common types of switch are of the single pole variety with either one set of contacts or two sets of contacts. The variety with one set of contacts has the contacts closed or engaged when the rotor speed is below the value for which the centrifugal means is adjusted, and opened or disengaged when the speed is above that value, while that variety employing two sets of contacts may have one set of contacts closed and the other set opened below a certain speed and the conditions reversed above that speed. I show the adaptation of the protective aspect of my invention to both varieties of switches as an indication of the flexibility of my invention.

In another aspect of my invention I employ the switch in the added capacity of obtaining what is known as a plug or a plugging stop. If the starting winding is connected across the power lines in a manner to create a torque tending to start the motor rotating in a certain direction, then after the motor has been brought to speed, it is possible to stop the motor quickly by reconnecting the starting winding but in a manner to create a torque in a direction opposite to the first. The motor will then come to a stop more rapidly than if it were permitted to coast. I apply this aspect of my invention to straight stopping of a motor and also to a motor which is continually reversing its direction of rotation.

Other features, objects and aspects of my invention will be apparent from the following description thereof, taken in conjunction with the drawings in which like reference characters refer to like parts and in which.

Figure 1:
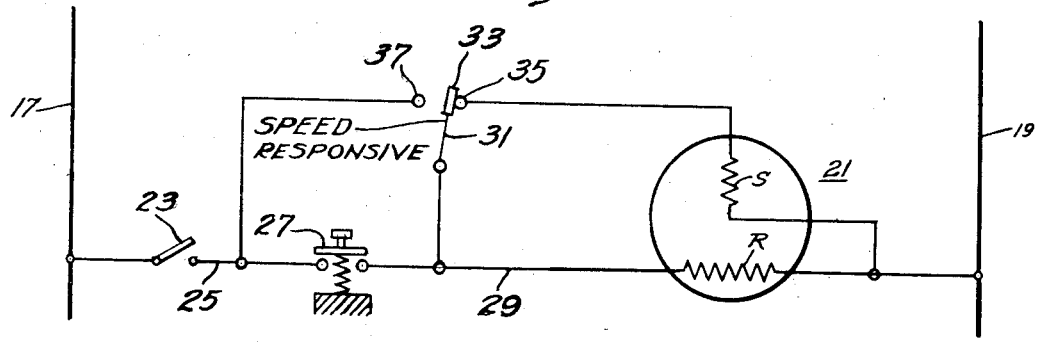
Figure 1 is a schematic wiring diagram of one embodiment of my invention employing a speed responsive switch having two sets of contacts for the protective aspect of my invention.

In the diverse embodiments of my invention, as shown in the above-identified figures, the split phase motor is generally represented by impedances R and S. The impedance R is representative of the running winding of the motor, and the impedance S is representative of the starting winding of the motor. These characters are intended to represent the windings and their circuits broadly, and I do not desire to be limited to an actual winding within the motor unless this is absolutely necessary. It is quite common in the control of split phase motors to obtain the split phase component by the insertion of a condenser in series with a starting winding whereby it will shift the phase of the current in the starting winding with respect to that of the current in the running winding, and the reference character S is intended to embrace this type of starting circuit as well as any other type of starting circuit which a designer may prefer. In any event the motor is such that it is desirable to disconnect the starting circuit or winding S after the rotor of the motor has attained a predetermined speed. To accomplish this a centrifugally actuated switch is generally employed and one which is adapted for the purpose is indicated in Fig. 6.

Figure 6:
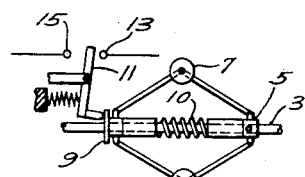
Fig. 6 is a view showing a simple centrifugal switch.

In Fig. 6 the rotor 3 of the motor has fixed thereto a collar 5. Centrifugal weights 7 are link connected at one end to the collar 5 and at the other end to a collar 9 slidably mounted on the rotor shaft 3. The collar 9 is forced away from the collar 5 by a compression spring 10. The collar 9 operates a spring pressed contact 11 which engages a contact 13 while the rotor speed is below a predetermined value and engages a contact 15 when the rotor speed is above that value. The switch just described is only indicative of a simple centrifugally operated switch, many others of which are well known in the art, and can be adapted to my invention. In fact, I do not necessarily desire to be limited to the particular switch described or any other type of switch, since there are many well known expedients by which a switch may be operated in response to the speed of a rotating member.

Referring now more particularly to Figs. 1 through 5, an alternating current source of power is indicated as having one bus 17 and a second bus 19 by which the split phase motor 21 is supplied with electrical energy.

In Fig. 1, the running winding R is energized by a circuit from bus 17 through main switch 23, conductor 25, push button switch 27, conductor 29 to the running winding and then to the other bus 19. The speed responsive switch which may be constructed as shown in Fig. 6 is generally indicated at 31 and has a contactor 33 movable in response to the speed of the motor between the stationary contacts 35 and 37. The contact 35 is connected to the starting circuit or winding S, the other end of which is connected to the bus 19, while the contact 37 is connected to the conductor 25. A direct connection is made from the contactor 33 to the conductor 29.

To start the motor in the embodiment shown in Fig. 1, the main switch 23 which may be of any appropriate type is first closed. At this point no power is, as yet, supplied to either of the windings of the motor. However, upon closure of the push button switch 27 the power circuit is completed to the running winding R via the conductor 29 and to the starting winding S via the contactor 33 and contact 35. The latter are engaged while the speed of the motor is below a predetermined value and this necessarily includes zero speed. With the circuits to the running and starting windings completed, the motor will begin to accelerate and when the speed reaches the value for which the contactor 33 leaves the contact 35 and engages the contact 37, the starting winding will be disconnected by the disengagement of 33 from 35, and the running winding will be supplied with power from a path paralleling the switch 27 and including the contactor 33 and the contact 37 which the latter now engages. The switch 27 may now be released and the motor will continue to rotate due to the fact that the running winding is energized by a circuit comprising bus 17, switch 23, conductor 25, contact 37, contactor 33, and conductor 29.

If now the motor should for any reason lose its speed, or become stalled, the position of the switch 31 will be changed by the contactor 33 leaving the contact 37 and engaging the contact 35. When the contactor 33 leaves the contact 37, the above described circuit to the running winding is opened at this point and the latter is deenergized. Engagement of the contactor 33 with the contact 35 does not energize the starting winding S for the reason that the energizing circuit of the latter now includes the open switch 27. It is, therefore, apparent that when the motor stalls, power is disconnected completely from both its windings so that there is no danger of either being subjected to enduring heat and consequent damage.

In Fig. 1, the starting of the motor is accomplished by push button 27 which must be held in closed position until the switch 31 changes the engagement of its contacts or somewhat thereafter.

In the foregoing embodiment, I have shown and described a protective aspect of my invention applied to motors rotating in a single direction, and the following embodiments incorporate a reversing switch for changing the phase relationship of the starting winding to tend to bring the motor to a plugging stop or for cyclically-reversible operation of the motor.

Figure 2:
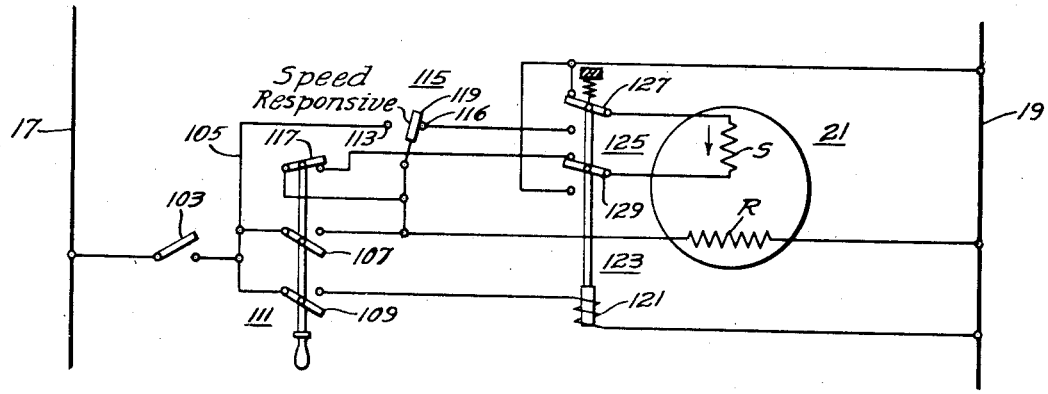
Fig. 2 is a schematic wiring diagram of an embodiment of my invention employing a speed responsive switch of two sets of contacts for a plugging stop.

The embodiment of Fig. 2 employs a speed responsive switch having two sets of contacts for the purpose of providing a plugging stop. In this figure the main switch is indicated at 103. When this switch is closed, the power bus 17 is connected to the conductor 105 which is directly connected to blades 107 and 109 of a switch 111 and is also connected to high speed contact 113 of speed responsive switch 115 whose low speed contact is designated by 116.

The switch 111 is of the three-pole type having the aforesaid blades 107 and 109 and also a blade 117. The terminal which cooperates with the blade 107 is directly connected to the running winding R, to the contactor 119 of the switch 115, and to the aforesaid blade 117. The cooperating terminal of the blade 109 is directly connected to a coil 121 of a relay 123, the other end of which is directed to the other power bus 19. The coil 121 controls the position of the reversing switch 125 having a blade 127 and a second blade 129 between which is connected the starting winding of the motor, as shown.

In normal position, the blades 107 and 109 of the switch 111 are in open circuit position while the blade 117 is in closed circuit position. To start the motor, switch 103 is closed and the switch 111 is operated so that blades 107 and 109 are in closed position and blade 117 in open position. Current is supplied through an obvious circuit to the coil 121 which pulls the blades 127 and 129 to their lower position against the action of an upwardly biasing spring, with reference to the figure.

The running winding will now be energized by a circuit including the now closed blade 107, and the starting winding will be energized from a circuit which includes the blade 107, the contactor 119 and contact 116 of switch 115, blade 127 in lower position, the starting winding, blade 129 in lower position, to the other power bus 19. The relative current phase in the starting winding is indicated by the arrow shown in this figure and a motor will start in a direction dependent upon this current phase.

As the motor speed increases, it ultimately reaches the value where the switch 115 is operated to open the contact elements 119 and 116 and close the contact elements 113 and 119. This will open the circuit to the starting winding and the motor will continue to operate with the running winding only energized. If now it is desired to bring the motor to a plugging stop, the switch 111 is restored to its normal position, that is, the position where the blades 107 and 109 open their respective circuits while the blade 117 closes its circuit. With the switch 111 in the position just described, the relay coil 121 is deenergized permitting blades 127 and 129 to resume their normal spring-biased upper positions, the running winding being maintained energized by a circuit from the conductor 105 and through the high speed contact elements 113 and 119 which now also energize the starting winding through a branch circuit including now closed blade 117, blade 129 in its upper position, the starting winding and blade 127 in its upper position.

It may be observed that in tracing the last circuit through the starting winding from the bus 17, as was done in determining the direction of the arrow shown, the circuit passes through the starting winding in a direction opposite to that of the arrow indicating that the phase relation of the current in the starting winding to that of the running winding has been reversed. Under these conditions the motor will, of course, tend to come to a plugging stop until the contactor 119 separates from the contact 113 whereupon both energizing circuits to the starting winding and running winding through the conductor 105 are automatically opened.

Figure 3:
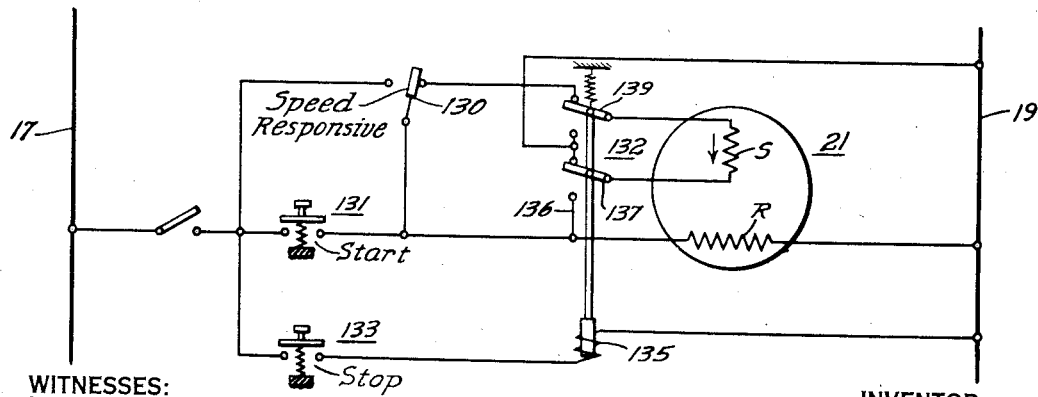
Fig. 3 is a schematic wiring diagram of a modification of the embodiment of Fig. 2, and which also employs a protective aspect of my invention.

It is apparent from the above described operation of Fig. 2 that this embodiment embraces a plugging stop with automatic circuit opening features but does not embrace the protective aspect of my invention. In Fig. 3 I show an embodiment in which the protective feature is incorporated with the plugging stop.

Referring to Fig. 3, the speed responsive switch 130 is shown in its low speed position. If the start button 131 is now closed, the running winding will be energized through an obvious circuit and the start winding will also be energized through the low speed contacts of the switch 130 and the upper normal position, with reference to the figure, of the reversing switch 132. The phase relationship of the current to the starting winding will again be as shown by the arrow, and the motor will tend to rotate in a certain predetermined direction. When the motor comes up to speed, the lower speed contacts of the switch 130 open to deenergize the starting winding and the high speed contacts of the switch 130 close to parallel the start switch 131, whereupon the latter may be released to its normal spring-biased open position, and the running winding will be supplied with power from the high speed contacts of the switch 130.

If the rotor of the motor should stall for any reason the high speed contacts open, thereby disconnecting the running winding and since the starting winding circuit will now be open at the switch 131, no power is applied to either winding of the motor and the protective feature of my invention obtains.

Assume, however, that the motor is running at its normal speed and it is desired to stop the same. In this instance the stop switch 133 is closed, thereby energizing coil 135 which changes the position of the reversing switch 132. The changing of position of the switch 132 will now complete a circuit through the starting winding which comprises the following: The high speed contacts of the switch 130, conductor 136, blade 137 in its lower position, the starting winding, blade 139 in its lower position to the power bus 19. This circuit, as was the case in Fig. 2, energizes the starting winding with its phase relationship reversed with respect to the phase relationship obtained when the start switch 131 was originally closed. Accordingly, the motor will tend to come to a plugging stop.

Figure 4:
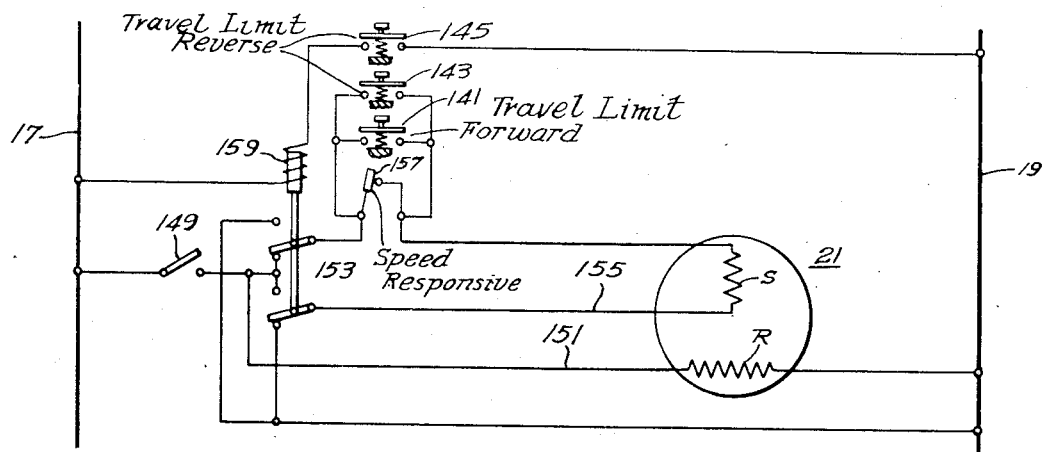
Figs. 4 and 5 are schematic wiring diagrams of embodiments of my invention showing a split phase motor employed in reversing cycles.
Figure 5:
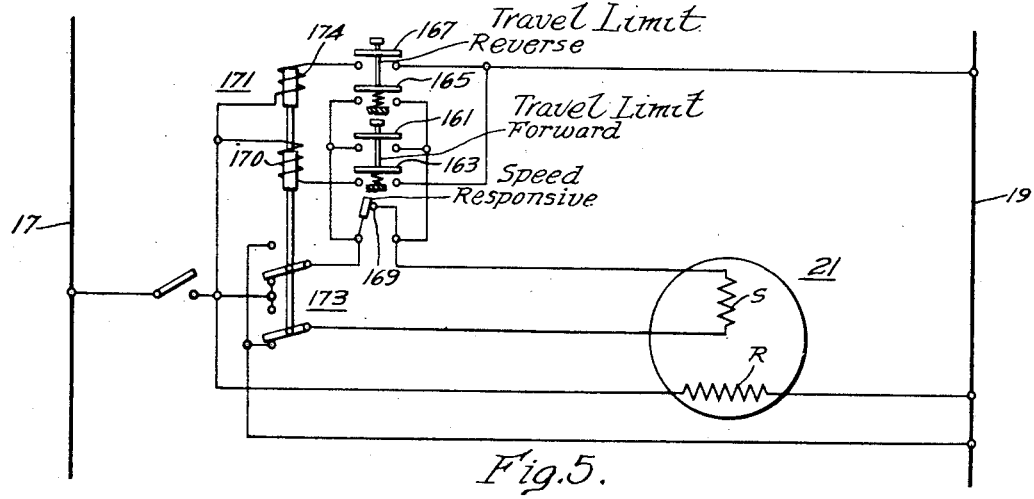

In Figs. 4 and 5 I show my invention applied to a split phase motor employed in automatic, cyclically-reversing operation as might be present, for example, in machine tools. As is well known in such reversing operation, the limit switches may be of different types and Figs. 4 and 5 are examples of the application of my invention to limit switches of two different types.

In Fig. 4, the reversing switches comprise a forward limit switch 141 and two reverse limit switches 143 and 145. The limit switches are of the type which are closed after a predetermined travel of the motor or an element moving in proportion to the movement of the motor and in such a manner that they remain closed until the motor has come to a stop and reached substantially running speed in a reverse direction. Assuming the parts to be in a position shown when the main switch 149 is closed, the running winding will be energized through a circuit including the line 151, and the starting winding will be energized through a circuit including the blades of the reversing switch 153 and the line 155. Assume this energizes the motor in such a manner as to cause the operating members for the limit switches to travel toward the reversing switches 143 and 145. When the motor comes up to speed, the speed responsive switch 157 will open the starting winding circuit and the motor will continue its forward rotation with its running winding energized until the reversing switches 143 and 145 are closed. Closure of the switch 145 energizes the relay coil 159 to reverse the connections of the switch 153 to the starting winding of the motor and closure of the switch 143 completes the circuit, whereupon the motor is quickly brought to a plugging stop and its direction of rotation reversed. When the motor has come to the proper speed in its reverse direction, the limit switches 143 and 145 open restoring the reversing switch to its original condition. However, the starting winding circuit is not completed, inasmuch as the switches 143 and 145 are now opened and the centrifugally operated switch 157 has been opened in the meantime, since it has been assumed that the limit switches are operated to remain in closed position until the motor comes up to approximately normal speed. The motor will, therefore, continue to operate until the forward limiting switch 141 is closed, whereupon the starting winding circuit is again energized through the reversing switch 153, now however, in a position to cause a plugging stop and rotation in the forward direction. In this manner the motor continues to operate between its limits of travel continuously, the starting circuit being open at the travel limit switches 141 and 143, and at the speed responsive switch 157, while the motor is operating at operating speds between the travel limits.

The system of Fig. 5 is essentially the same as that of Fig. 4 in operation, except that the limit switches are of different character. In this embodiment the forward limiting switches 161, 163 and the reversing limit switches 165, 167 are of the type which close momentarily and only for a time sufficient to allow the motor speed to come down to a value which will permit the speed responsive switch 169 to close. The limit switches 161 and 165 parallel the speed responsive switch so that the circuit to the starting winding will be completed through one or the other when the motor has travelled the requisite distance.

In the forward direction the switch 163 energizes a coil 170 of the two position double coil relay 171 to place the reversing switch 173 with its contacts in the upper position, with reference to the figure. At the limit of the reverse direction, the limit switch 167 energizes the second coil 174 of the relay 171 to place the blades of the reversing switch 173 in their lower position. In this way the motor is continually reversed during normal operation. However, there is this much distinction to be noted with respect to the operation of Fig. 5, as compared to that of Fig. 4. Once the motor speed falls below the value necessary to close the switch 169 during the reversing action of the motor, the last switch controls the energizing circuit of the starting winding in the customary manner. The general purpose of the system of Fig. 5 is to adapt a motor of the type described for cyclically-reversible operation including a plugging stop between reversals. The system of Fig. 5 assures cut-out of the starting winding upon the motor attaining the proper cut-out speed. It is obvious that the same function can be given to the switch 157 of Fig. 4 by making the limit switches 141 and 143 of Fig. 4 of the same character as Fig. 5, that is, of the type that need be closed for a time only sufficient to slow the motor to the speed at which the centrifugally operated switch assumes its closed low-speed position to complete the circuit to the starting winding. It may, therefore, be observed that the numerous objects and features mentioned in the beginning of this description, as well as others, are accomplished in the embodiments of my invention, and while I have illustrated my invention in the forms which I now believe to be the best modes of application thereof, it is obvious that many changes may be made within the spirit and scope of the novel system which I have introduced. It is desired, therefore, that the appended claims be given the broadest construction and limited only by the prior art.

I claim as my invention:

1. A split phase motor having a rotor, a starting winding and running winding, means and connections for supplying power to said running winding and to said starting winding including a reversing switch means for reversing the phase of the current through said starting winding and a switch means responsive to the speed of the rotor for interrupting the current through the said starting winding when the speed of the rotor is above a predetermined value, and means operable for operating said reversing switch means and for re-establishing the supply of power to the said starting winding while the speed is above said value to establish a torque in said motor opposite in direction to the direction of rotation of the rotor, and means operative after the rotor speed is beyond said value and including the speed responsive switch means for disconnecting both windings from the source of power if the rotor should become stalled.

2. A split phase motor having a rotor, a starting winding and a running winding, means and connections for supplying power to said running winding and to said starting winding including a reversing switch means for reversing the phase of the current through the starting inding and a speed responsive switch means responsive to the speed of the rotor for interrupting the supply of power to said starting winding when the speed is above a predetermined value, means for operating said reversing switch means and for re-establishing the supply of power to the said starting winding while the speed is above said value to establish a torque in said motor opposite in direction to the rotation of the rotor, said last named means comprising travel limit switch devices in parallel with said speed responsive switch means.

3. A split-phase motor having a rotor, a starting winding and a running winding, means and connections for supplying power to said running winding and to said starting winding, including a reversing switch means having different operative circuit-connecting positions for controlling the relative phase of current-flow through said starting winding, and a switch means responsive to the speed of the motor operative for interrupting the connections to said starting winding while the motor speed is above a predetermined value, the first said means being so arranged that, with said reversing switch means in operative circuit-connecting position, current-flow through said starting winding is stopped after operation of said speed-responsive switch means, and means for operating said reversing switch means to another operative position and for re-establishing current-flow to said starting winding while the motor speed is above said value, to establish a torque in said motor opposite in direction to the direction of rotation of the motor.

4. A split-phase motor having a starting winding and a running winding, said motor being of the type requiring energization of both windings to start, and the running winding only to run; means including connections for connecting said motor to a source of power, and comprising a reversing switch means having a circuit-connecting position for permitting current-flow to said starting winding in one phase relation, and a second circuit-connecting position for permitting current-flow to said starting winding in a reversed phase relation, and a switch means responsive to the speed of the motor having a low-speed position and a high-speed position; said connections being such that said speed-responsive switch means permits current-flow to said starting winding in its low-speed position and stops current-flow to said starting winding in its high-speed position, and while said reversing switch means is in either of the said positions of said reversing switch means; and actuable connection means for reconnecting said starting winding to the source of power while said speed-responsive switch means is in its high-speed position.

5. A split-phase motor having a starting winding and a running winding, said motor being of the type requiring energization of both windings to start, and the running winding only to run; means including connections for connecting said motor to a source of power, and comprising a reversing switch means having a circuit-connecting position for permitting current-flow to said starting winding in one phase relation, and a second circuit-connecting position for permitting current-flow to said starting winding in a reversed phase relation, and a switch means responsive to the speed of the motor and having a low-speed position and a high-speed position; said connections being such that said speed-responsive switch means permits current-flow to said starting winding in its low-speed position and stops current-flow to said starting winding in its high-speed position, and while said reversing switch means is in either of the said positions of said reversing switch means; and actuable connection means for reconnecting said starting winding to the source of power while said speed-responsive switch means is in its high-speed position, said actuable connection means including an operable switch means in parallel with said speed-responsive switch means.

6. A split-phase motor having a starting winding and a running winding, said motor being of the type requiring energization of both windings to start, and the runninig winding only to run: means including connections for connecting said motor to a source of power, and comprising a reversing switch means having a circuit-connecting position for permitting current-flow to said starting winding in one phase relation, and a second circuit-connecting position for permitting current-flow to said starting winding in a reversed phase relation, and a switch means responsive to the speed of the motor and having a low-speed position and a high-speed position; said connections being such that said speed-responsive switch means permits current-flow to said starting winding in its low-speed position and stops current-flow to said starting winding in its high-speed position, and while said reversing switch means is in either of the said positions of said reversing switch means; and actuable connection means for reconnecting said starting winding to the source of power while said speed-responsive switch means is in its high-speed position, said actuable connection means including travel limit switch devices selectively operable upon a predetermined travel of said motor in either direction of rotation of said motor.

7. A split-phase motor having a starting winding and a running winding, said motor being of the type requiring energization of both windings to start, and the running winding only to run; means including connections for connecting said motor to a source of power, and comprising a reversing switch means having a circuit-connecting position for permitting current-flow to said starting winding in one phase relation, and a second circuit-connecting position for permitting current-flow to said starting winding in a reversed phase relation, and a switch means responsive to the speed of the motor and having a low-speed position and a high-speed position; said connections being such that said speed-responsive switch means permits current-flow to said starting winding in its low-speed position and stops current-flow to said starting winding in its high-speed position, and while said reversing switch means is in either of the said positions of said reversing switch means; and actuable connection means for reconnecting said starting winding to the source of power while said speed-responsive switch means is in its high-speed position, said actuable connection means including means for operating said reversing switch means upon a predetermined travel of said motor.

FREDERICK D. SNYDER.